June 3, 1958  G. W. SCHWAGER ET AL  2,837,307
SUPPORTS
Filed Jan. 27, 1954  3 Sheets-Sheet 1
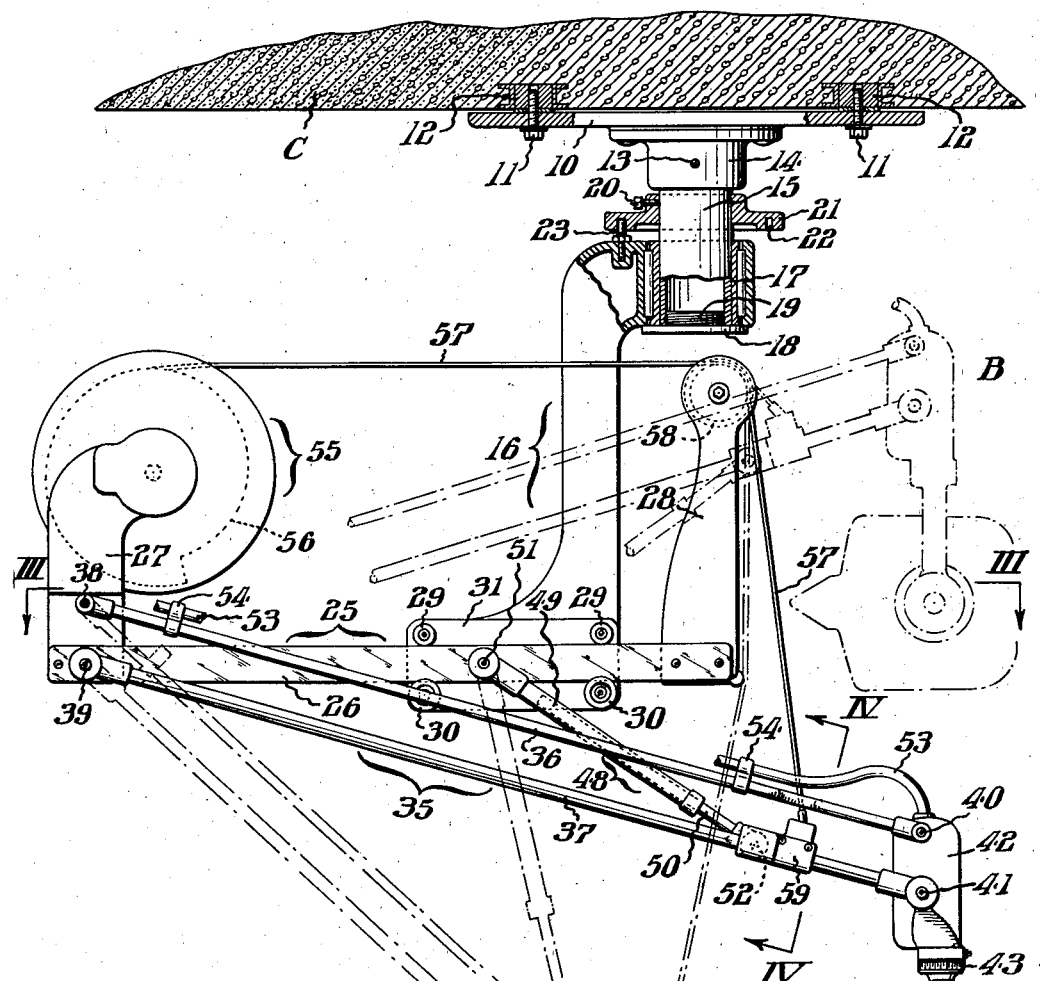
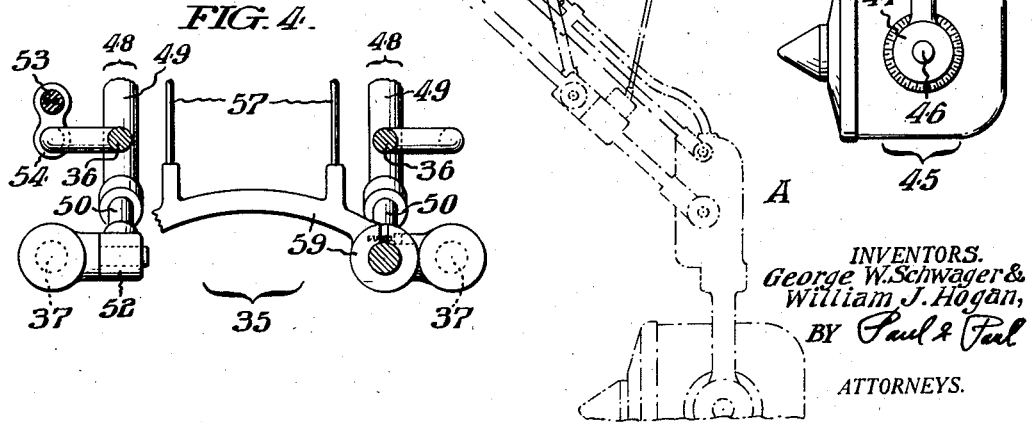
INVENTORS.
George W. Schwager &
William J. Hogan,
BY Paul & Paul
ATTORNEYS.

June 3, 1958  G. W. SCHWAGER ET AL  2,837,307
SUPPORTS
Filed Jan. 27, 1954  3 Sheets-Sheet 2
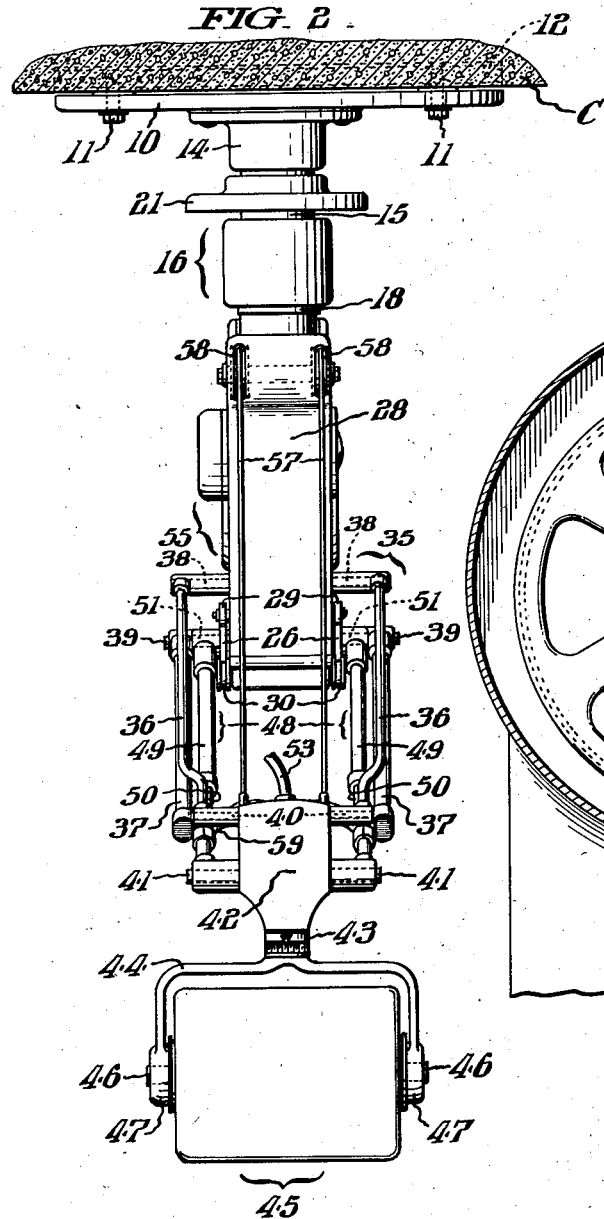
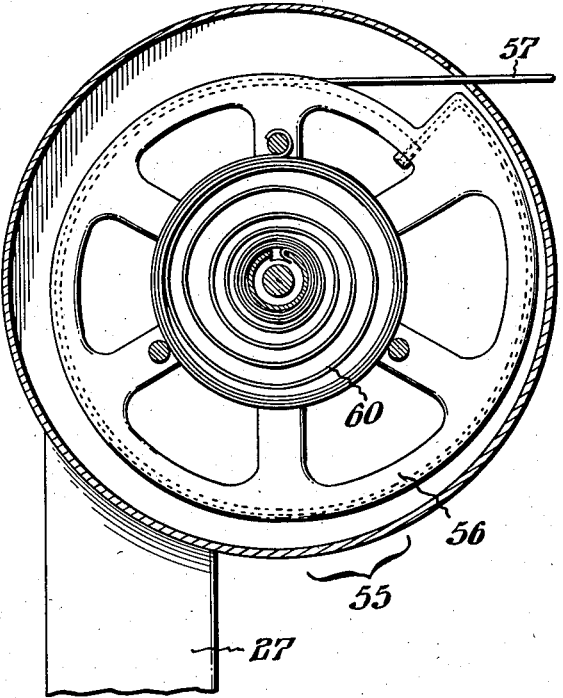
INVENTORS.
George W. Schwager &
William J. Hogan,
BY
ATTORNEYS.

June 3, 1958   G. W. SCHWAGER ET AL   2,837,307
SUPPORTS
Filed Jan. 27, 1954   3 Sheets-Sheet 3

INVENTORS.
George W. Schwager &
William J. Hogan,
BY
ATTORNEYS.

United States Patent Office 2,837,307
Patented June 3, 1958

2,837,307
SUPPORTS

George W. Schwager, Silver Spring, Md., and William J. Hogan, Philadelphia, Pa., assignors to Franklin X-Ray Corporation, Philadelphia, Pa., a corporation of Pennsylvania Application January 27, 1954, Serial No. 406,414

5 Claims. (Cl. 248—325)

This invention relates to supports. More particularly, it is concerned with supports useful, for example, in sustaining dental X-ray units or other implements. Supports heretofore devised for such purposes were generally either of the floor stand or of the wall bracket types whereof the movable arms were awkward of manipulation and, by reason of their presence, interfered with free movement of the dentists or surgeons about the patients, when in reclining or lying position, in making necessary adjustments or otherwise ministering to them.

The chief aim of our invention is to overcome the above mentioned drawbacks. This objective is realized in practice, as hereinafter more fully disclosed, through provision of a support which is simple and compact in construction; by which the X-ray unit or other appliance is sustained in suspension from the ceiling of a room or compartment in such manner that it may be moved up clear out of the way, when its use is not required, or lowered to any desired level; which is easy of manipulation for accurate placement of the X-ray unit or appliance in relation to the patient; and which, moreover, is sturdy and stable against vibration in any position of adjustment.

Other objects and attendant advantages will appear from the following detailed description of the attached drawings, wherein:

Fig. 1 is a view in side elevation of a support conveniently embodying our invention, with portions broken away and others shown in vertical section for exposure of important structural details which otherwise would be hidden.

Fig. 2 shows the support in end elevation as seen from the right of Fig. 1.

Fig. 4 is a cross section taken as indicated by the angled arrows IV—IV in Fig. 1 and drawn to a larger scale; and Fig. 5 is a fragmentary view in longitudinal section of a counterbalance means associated with the support.

Figure 3:
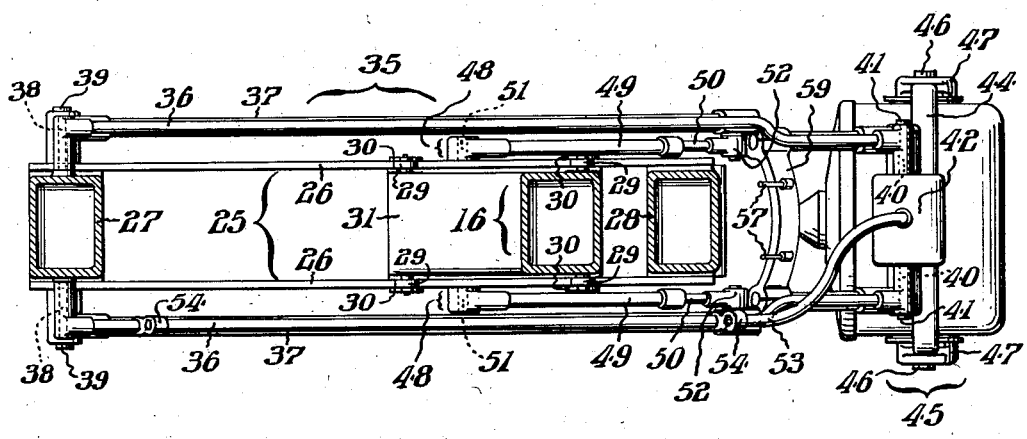
Fig. 3 is a horizontal section taken as indicated by the angled arrows III—III in Fig. 1.

As herein exemplified, our improved support comprises a plate 10 which, by means of cap screws 11, is secured to suitable anchorages 12 embedded into the ceiling C of an apartment or a room. Fixed, by means of a set screw 13, in the central boss 14 of the plate 10 is a short tubular stub shaft 15; and arranged to swivel about the protruding end of said shaft is an L-shaped hanger bracket 16. The bearing 17 at the top end of the hanger bracket 16 is of the anti-friction pin roller type, said bracket being held in assembly by a retaining cap 18 of which the diametrically-reduced portion 19 is threadedly engaged within the hollow of the shaft 15. Secured to the stub shaft 15 above the bearing 17 of the hanger bracket 16 by a set screw 20 is a collar 21 having, in its lower face, a concentric groove 22 of somewhat less than 360 degrees in extent into which projects an upstanding stop pin 23 on said bracket.

Sustained by the hanger bracket 16 with capacity for being shifted horizontally back and forth radially of the axis of the stub shaft 15 is an elongate slide carriage 25. As shown, the carriage 25 is of open construction, the same having laterally-spaced parallel side bars 26 between which are secured, at opposite ends, standards 27 and 28. The side bars 26 of the carriage 25 are engaged between pairs of upper and lower rollers 29 and 30 respectively at opposite sides of the horizontal bottom leg 31 of the bracket 16, the lower rollers 30 being flanged for positive guidance of the carriage.

The arm comprehensively designated 35 comprises two laterally-spaced pairs of parallel rods 36, 37 which, respectively, are fulcrumed to vertically-spaced studs 38, 39 at opposite sides of the carriage 25 at one end of the latter. The distal ends of the rods 36 and 37 are pivotally engaged with vertically-spaced trunnions 40 and 41 projecting laterally from opposite sides of a bearing head 42. Swivelly connected to the bearing head 42 as at 43 is a pendent yoke 44 for the X-ray unit 45 having trunnions 46 at opposite sides engaged in bearing bosses 47 at the extremities of said yoke. The X-ray unit 45 may be of a well known and approved commercially-available type and, per se, is not of our invention.

In order to stabilize the arm 25, we have provided a pair of links 48 each formed in two sections 49 and 50, one telescopically engaged in the other. The sections 49 of the links 48 are pivotally connected respectively to studs 51 projecting laterally from the side bars 26 of the carriage 25 at a point medially of the length of said carriage, and the sections 50 are pivotally connected to collars 52 affixed to the lower rods 37 of the arm 35 adjacent the distal ends of said rods.

Electric current for the operation of the X-ray unit 45 is supplied through a conductor cable 53 attached, by clips 54, to one of the upper rods 36 of the arm 35.

In accordance with our invention, the combined weight of the arm 35 and the X-ray unit 45 is compensated for by a counterbalance means 55, see Figs. 1 and 5, mounted on the standard 27 at one end of the slide carriage 25. As shown, the counterbalance means 55 includes a take-up spool 56 for lines or light cables 57 which may be of steel wire, and which pass horizontally from the spiral periphery spool to grooved pulleys 58 journalled at the top of the standard 28 at the opposite end of the slide carriage 25, and then downwardly, their terminal ends being secured to a cross bar 59 (see Figs. 1 and 4) bridged between the lower rods 37 of the arm 35 adjacent the collars 52. The weight pull on the lines or cables 57 is yieldingly resisted by a spiral torsion spring 60 (Fig. 5) which tends to rotate the spool 56 counter-clockwise.

By raising or lowering the arm 35, it will be seen that the X-ray unit 45 can be positioned at any desired level, as instanced in full lines and in dot and dash lines at A in Fig. 1, moved horizontally, and the suspension bodily swung about the stub shaft 15 through any arc within the limits of 360 degrees. These manipulations are accomplished with a minimum of effort due to the counterbalancing of the arm 35, the frictionless bearing between the hanger bracket 16 and the stub shaft 15, and the roller guidance of the carriage 25. After being positioned as necessary or desired, the X-ray unit 45 can be accurately adjusted for projection of its rays at any required angle by swinging it up or down on its trunnions 46 and by turning the yoke 44 about its swivel connection 43 with the head 42 at the distal end of the arm 35. As the arm 35 is raised or lowered as just described, the telescopic links 48 automatically shorten or lengthen and function effectively as stabilizers to prevent vibration of the support in any position to which it may be moved. When the use of the X-ray unit is not required, the arm 35 can be swung high up out of the way to the broken line position B in Fig. 1 to provide ample head clearance for persons to pass beneath the support at such times.

This application is subject to a grant by the applicants hereto to the United States of America of a non-exclusive irrevocable royalty-free license to make, use and sell the invention described in this application for all governmental purposes.

Having thus described our invention, we claim:

1. In a support for a dental X-ray unit or the like, an anchorage member adapted to be secured to the ceiling of a room or compartment, said member having a pendent vertical axis stub shaft; a drop bracket having a swivel bearing at the top engaged with said shaft projection and a radial extension at the bottom; an elongate open carriage guided for horizontal adjustment between spaced pairs of upper and lower rollers at opposite sides of the radial extension of the bracket; a pair of forwardly-reaching arms fulcrumed at the rear end of the carriage at opposite sides for up and down adjustment; a crosshead pivotally connected to the distal ends of the respective arms; an X-ray unit supported by said head; and means for counterbalancing the combined weight of the arms and the X-ray unit.

2. The invention according to claim 1, wherein each arm comprises a pair of parallel rods respectively fulcrumed at their rear ends to the carriage and pivotally connected at their distal ends to the crosshead.

3. The invention according to claim 1, wherein the carriage is provided at opposite ends respectively with bearing standards; and wherein the counterbalancing means comprises a spring-torsioned spool rotatively supported at the top of the standard at the rear end of the carriage, a grooved guide wheel rotatively supported at the top of the standard at the front end of the carriage, and a cord or cable affixed at one end to the drum of the spool, said cord or cable being diverted downwardly about the guide wheel and connected to the arm adjacent the distal end of the latter.

4. The invention according to claim 1, further including means for stabilizing the arm in different positions of up and down adjustment.

5. The invention according to claim 1, further including means for stabilizing the arm in different positions of up and down adjustment; said stabilizing means comprising a pair of links each formed by two telescoping sections, corresponding sections of the respective links being pivotally connected to opposite sides of the carriage and the other sections being respectively connected to the arms adjacent the distal ends of the latter.

References Cited in the file of this patent

UNITED STATES PATENTS

| | | |
|---|---|---|
| 565,076 | Harrison | Aug. 4, 1896 |
| 1,065,155 | McCanse | June 17, 1913 |
| 1,530,063 | Tichy | Mar. 17, 1925 |
| 2,036,097 | Pieper | Mar. 31, 1936 |
| 2,061,723 | Vavro | Nov. 24, 1936 |
| 2,200,518 | Perbal | May 14, 1940 |